INVENTORS
Jack M. Miller,
Raymond L. Scott,
William W. Crafton &
Lowell B. Van Dyke
BY Paul E. Mullendore
ATTORNEY March 3, 1964
J. M. MILLER ETAL
3,122,869
MACHINE FOR FORMING MEAT BALLS AND AUTOMATICALLY
PLACING THE MEAT BALLS IN CANS
Filed Oct. 3, 1961
5 Sheets-Sheet 2
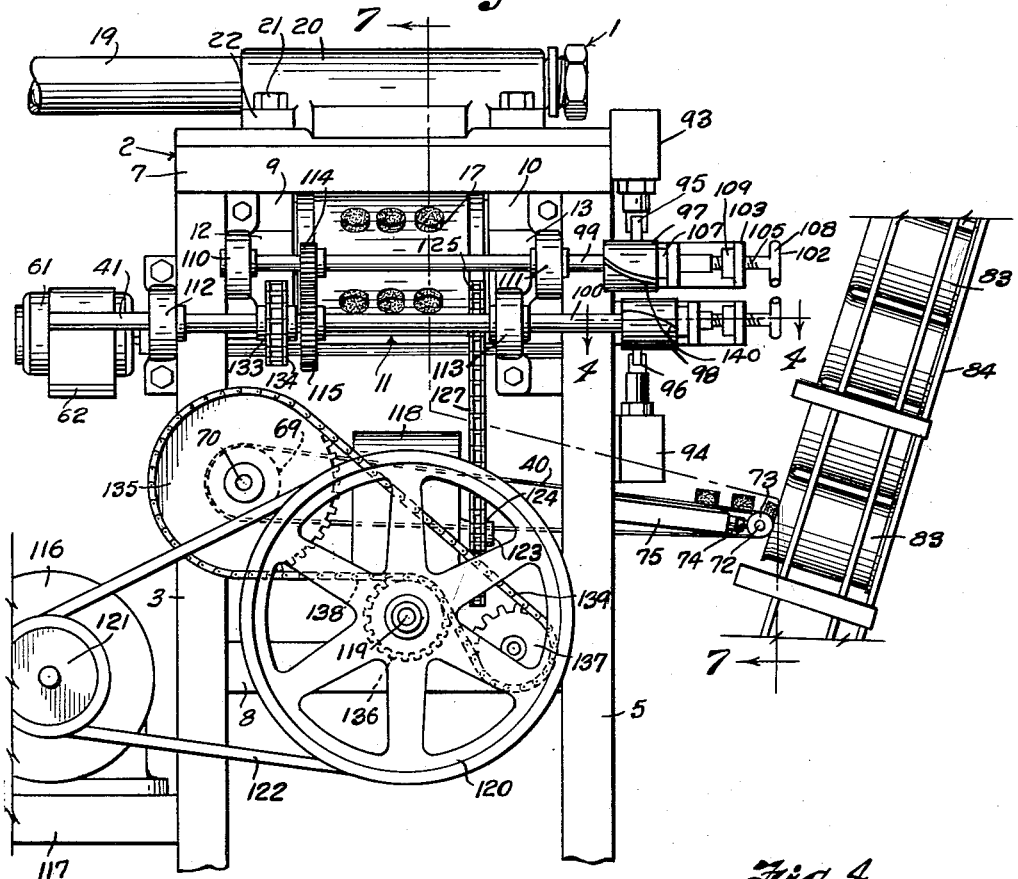
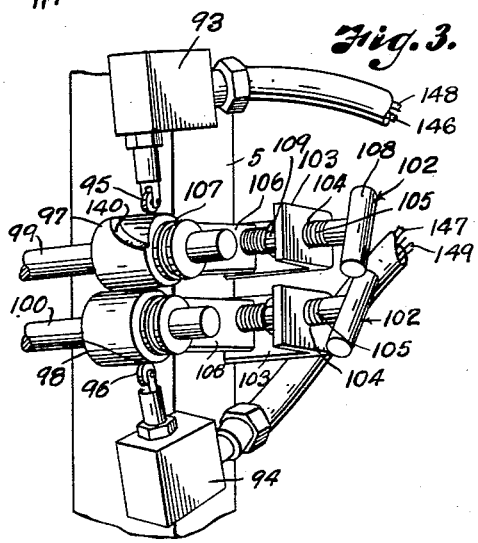
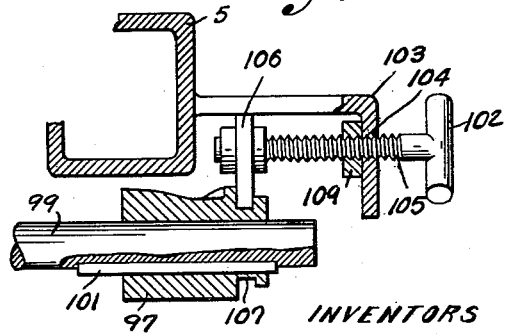
INVENTORS
Jack M. Miller,
Raymond L. Scott,
William W. Crafton &
Lowell B. Van Dyke
BY Paul E. Mullendore
ATTORNEY

March 3, 1964

J. M. MILLER ETAL
MACHINE FOR FORMING MEAT BALLS AND AUTOMATICALLY PLACING THE MEAT BALLS IN CANS 3,122,869

Filed Oct. 3, 1961

INVENTORS
Jack M. Miller,
Raymond L. Scott,
William W. Crafton &
Lowell B. Van Dyke
BY Paul E. Mullendore
ATTORNEY

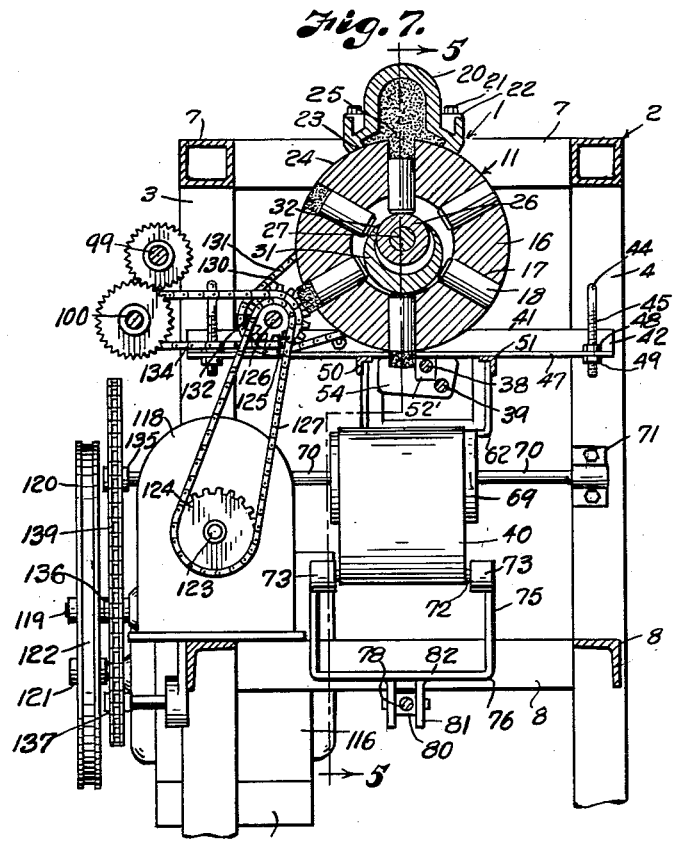
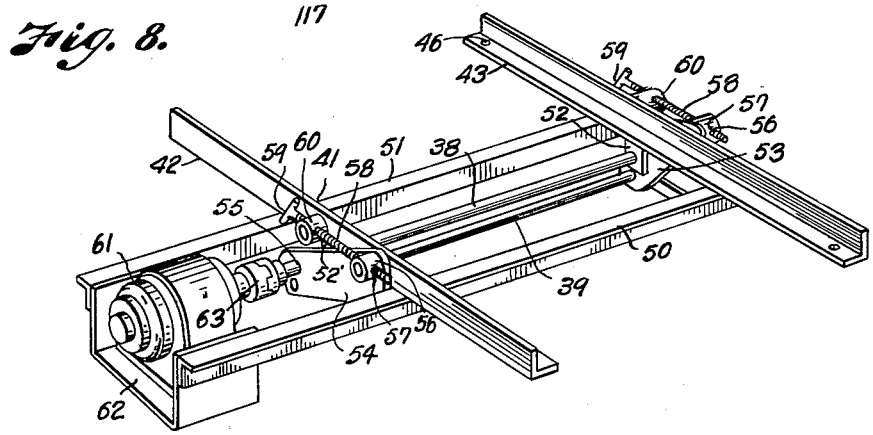

March 3, 1964

J. M. MILLER ETAL  3,122,869
MACHINE FOR FORMING MEAT BALLS AND AUTOMATICALLY
PLACING THE MEAT BALLS IN CANS

Filed Oct. 3, 1961  5 Sheets-Sheet 5

INVENTORS
Jack M. Miller,
Raymond L. Scott,
William W. Crafton &
Lowell B. Van Dyke BY Paul E. Mullendore
ATTORNEY

United States Patent Office 3,122,869
Patented Mar. 3, 1964

3,122,869
MACHINE FOR FORMING MEAT BALLS AND AUTOMATICALLY PLACING THE MEAT BALLS IN CANS
Jack M. Miller, Shawnee Mission, Kans., and Raymond L. Scott, William W. Crafton, and Lowell B. Van Dyke, Trenton, Mo., assignors to Marlen Equipment Company, Overland Park, Mich., a corporation of Missouri
Filed Oct. 3, 1961, Ser. No. 142,664
16 Claims. (Cl. 53—122)

This invention relates to a machine for forming a meat preparation into like shapes of uniform size and discharging them into cans, as, for example, in the canning of meat balls and spaghetti.

Such meat preparations are a viscous mass that has very sticky characteristics, so that it is difficult to mold and discharge from the mold without damaging the shape of the product, particularly at high speed operations. Also, it is required to place a given number of meat balls into each can, to conform with the number specified on the label.

It is, therefore, a principal object of the present invention to provide an apparatus for freeing the meat balls or the like from the forming mechanism without distortion, and to transport the meat balls in orderly, spaced apart relation into the cans.

A further object of the invention is to operate the carrier at different speeds in accordance with the dwell of the cans, to deliver the required number of meat balls into each can as it is caused to pause at the filling station.

Another object of the invention is to provide means for easily and quickly changing the number of meat balls that are discharged into each can.

Another object of the invention is to provide a feeding and packaging apparatus of relatively simple construction that is reliable in operation and wherein the control of the product is easily adjustable while the forming mechanism is in operation.

In accomplishing these and other objects of the invention as hereinafter described, we have provided improved structure, the preferred form of which is illustrated in the accompanying drawings, wherein:

FIG. 2 is a side elevational view of the machine.

FIG. 3 is a fragmentary perspective view of the switch operating cams for controlling the number of meat balls deposited in each can.

FIG. 4 is a fragmentary horizontal section through one of the cams and showing the adjustment thereof.

FIG. 7 is a transverse vertical section through the machine taken on the line 7—7 of FIG. 2.

FIG. 8 is a perspective view of the stripping roller unit as it appears when removed from the machine.

Figure 1:
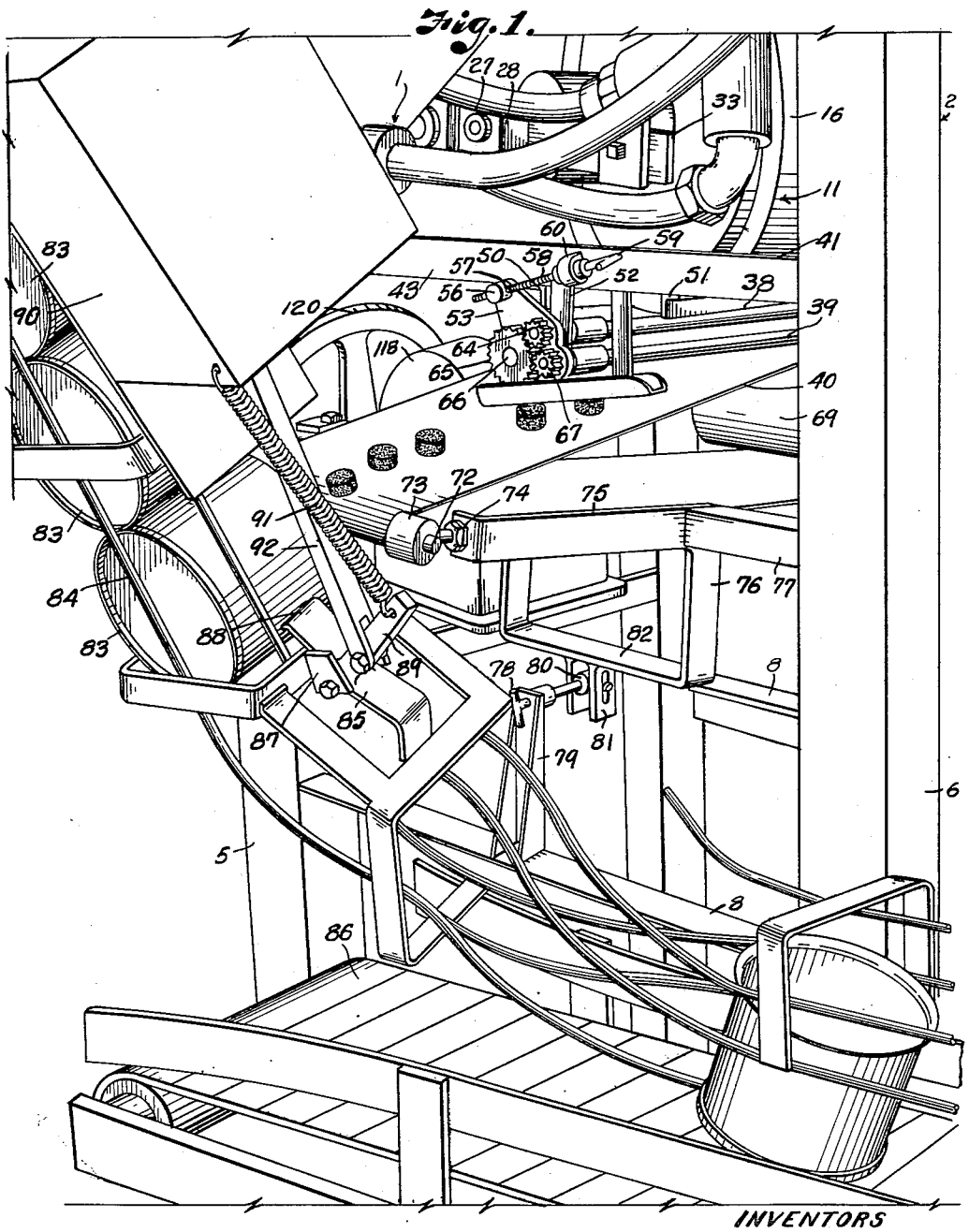
FIG. 1 is a perspective view of a forming machine equipped with an apparatus for feeding and packaging the meat balls discharged therefrom and particularly showing the stripping rolls and carrier for depositing the meat balls into cans.

Referring more in detail to the drawings:
1 designates an apparatus constructed in accordance with the present invention and which includes a rectangular frame 2 having corner legs 3, 4, 5 and 6 connected at their upper ends by horizontal rails 7 extending along the four sides thereof. Also interconnecting the legs at a lower level are horizontal rails 8. Supported from opposite upper rails 7 at two sides of the frame are brackets 9 and 10 for mounting a forming assembly 11, which is illustrated in detail in the copending application of Jack M. Miller, et al., filed July 10, 1961, Serial No. 123,019, however, it is briefly described herein in order to better explain the operation of the apparatus included in the present invention.

Figure 5:
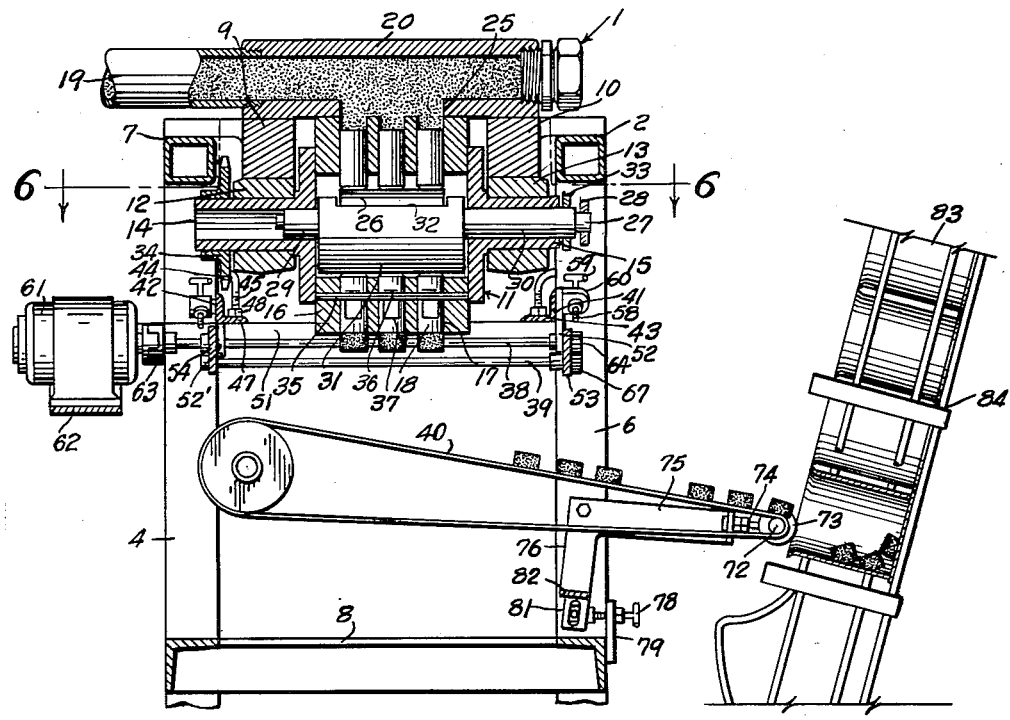
FIG. 5 is a vertical section through the machine on the line 5—5 of FIG. 7.
Figure 6:
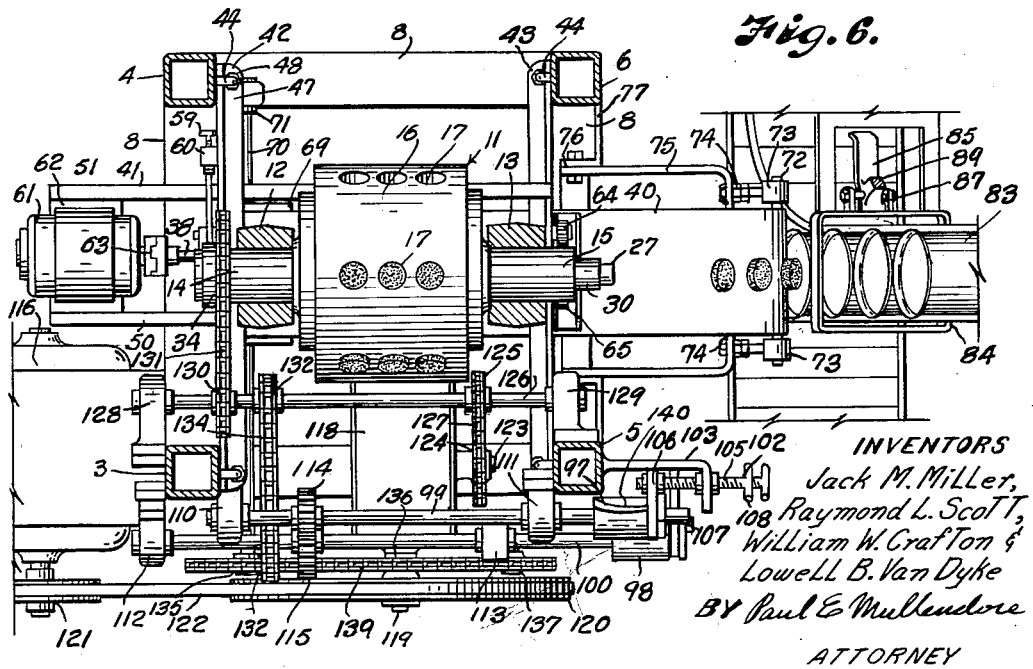
FIG. 6 is a horizontal section taken on the line 6—6 of FIG. 5.

Depending from each bracket 9 and 10 are bearings 12 and 13 (see FIGS. 5 and 6). Rotatably mounted in the bearings are stub shafts 14 and 15 of a cylindrical rotor 16 having a plurality of radial bores 17 arranged in rows. The rotor illustrated has three bores in each row, with the rows of bores arranged longitudinally of the axis of the rotor, and there are six rows of bores arranged circumferentially. The number of rows and the number of bores in a row may vary, depending on the desired capacity of the machine.

Slidably contained in each bore is a piston 18. The pistons 18 are actuated toward the axis of rotation by the pressure of the meat preparation which is delivered under pressure through a conduit 19 that is connected with a manifold 20 extending along the top of the rotor. The manifold 20 has the ends thereof fixed to the brackets 9 and 10 on the opposite side to the bearings 12 and 13 by fastening devices such as bolts 21 extending through laterally projecting ears 22. The manifold has an arcuate underface 23 in contact with the cylindrical surface 24 of the rotor. Formed in the manifold and having registry with the bores as the bores successively pass under the manifold is a port 25 through which the meat preparation is forced under pressure into the bores to cooperate with the pistons in forming the meat balls.

In order to adjustably control inward radial movement of the pistons, and consequently the thickness of the meat balls, the inner ends of the pistons in filling position ride upon a roller 26 that is carried on an eccentric portion of a shaft 27. Fixed to the shaft 27 is an arm 28, having its free end adjustably attached to a part of the frame, as disclosed in the above mentioned application. The shaft 27 has its ends supported in eccentric bores of tubular shafts 29 and 30 that are in turn rotatably adjustable in axial bores of the stub shafts 14 and 15.

Figure 9:
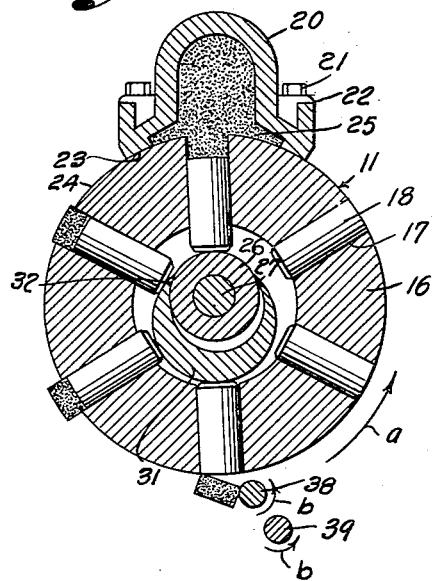
FIG. 9 is an enlarged section through the molding rotor, and particularly illustrating contact of the meat balls with the first stripping roller.
Figure 10:
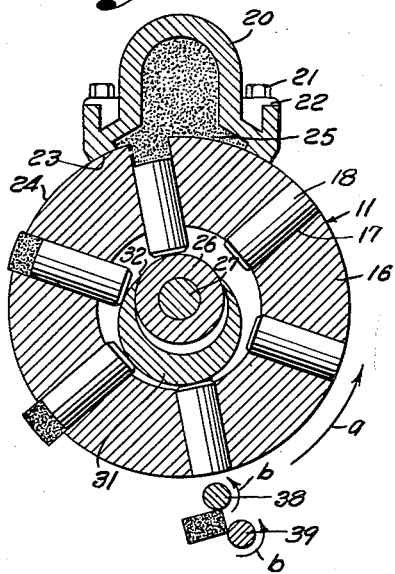
FIG. 10 is a similar view showing the meat ball engaging the second of the stripping rollers.
Figure 11:
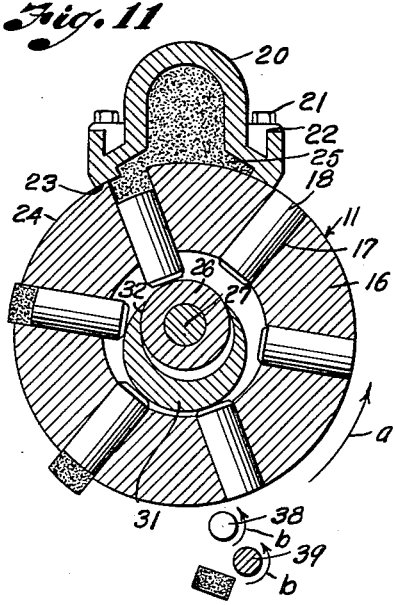
FIG. 11 is a similar view showing the complete disengagement of the meat ball to drop upon the conveyor belt that carries the meat balls into the can.

The shafts 29 and 30 carry therebetween a cylindrical cam 31 having a recess 32 in the upper side thereof for accommodating the roller 26, so that the periphery of the cam 31 cooperates with the roller in controlling reciprocation of the pistons as the cylinder is rotated. The cam 31 is retained in a fixed position by an arm 33, similar to the arm 28. The pistons are of a length relatively to the bores so that when a row of bores 17 register with discharge port 25 of the manifold, the pressure of the meat preparation acts upon the end faces of the pistons and moves the pistons inwardly of the bores until they are stopped by the roller 26. Upon continued movement of the rotor 16, as indicated by the arrows a in FIGS. 9, 10 and 11, the charged bores ride under the arcuate surface of the manifold to cut off and form the individual meat balls. As the rotor continues to turn, the inner ends of the pistons ride along the surface of the eccentric cam 31, which pushes the pistons outwardly, as shown in FIGS. 9, 10 and 11, to effect gradual discharge of the meat balls. By the time the rotor has turned 180°, the meat balls are fully ejected, but they may tend to stick to the faces of the pistons, and the present invention includes a mechanism to strip them off with continued rotation of the rotor. The rotor is continuously actuated by a sprocket 34 fixed on the end of the stub shaft 14. The pistons have limited movement in the bores of the rotor by transverse rods 35 engaged by stop shoulders 36 and 37 of the pistons.

The stripping mechanism includes upper and lower stripping rollers 38 and 39 that form a part of the present invention in combination with the rotor and a conveyor belt 40 which carries the stripped-off meat balls to the cans, as now to be described.

The stripping rollers 38 and 39 are carried parallel with the axis of the rotor by a frame 41, best illustrated in FIG. 8. The stripping unit frame 41 comprises spaced apart rails 42 and 43 having their ends adjustably supported from the legs of the main frame by brackets 44, having depending threaded shanks 45 extending through openings 46 in flanges 47 of the rails. The rails are adjustably fixed to the shanks 45 by pairs of stop nuts 48 and 49 that are threaded on the shanks of the brackets and engage the respective upper and lower faces of the flanges 47. With this arrangement, the rails may be raised or lowered with respect to the rotor and retained in a fixed position. Carried transversely of the rails 42 and 43 below the rotor 16 are spaced apart rails 50 and 51.

Rotatably mounted in fixed bearings 52—52' that depend from the rails 42 and 43 is the upper stripping roller 38 to engage the ejected meat balls, as shown in FIG. 7. The lower stripper roller 39 is carried by bell crank levers 53 and 54 that are journaled, as at 55 (FIG. 8) on the upper stripping roller 38, as best shown in FIG. 8. The bell cranks 53 and 54 are adjustably supported to swing the stripping roller 39 about the axis of the stripping roller 38, for effecting best discharge of the meat balls, as later described. The arms of the bell cranks 53 and 54 have outwardly projecting lugs 56 provided with threaded openings 57 (FIGS. 1 and 8) for the threaded shanks 58 of adjusting screws 59 which are swivelly journaled by lugs 60 carried by the rails 42 and 43, as shown in FIGS. 1 and 8. It is obvious that by turning the adjusting screws 59, the bell cranks are rocked about the axis of the roller 38, to position the lower stripping roller 39 relatively thereto, as later described.

The upper stripping roller 38 is constantly rotated by a motor 61 which is carried on a saddle 62 attached to the ends of the rails 50 and 51, the motor being connected with the stripping roller 38 by a flexible coupling 63. The opposite end of the stripping roller 38 carries a gear 64 that meshes with an idle gear 65 journaled on a stud 66 projecting from the outer face of the bell crank 54 (FIG. 1). Meshing with the idle gear is a gear 67 that is fixed on the stripping roller 39 to drive the stripping roller 39 in the same direction and at the same speed as the stripping roller 38 in the direction of the arrows b (FIGS. 9, 10 and 11).

The rear end of the conveyor belt 40 is carried on a roller 69 that is fixed to a shaft 70, having its ends journaled in bearings 71 attached to the inner face of the legs 3, 4. The opposite end of the belt operates over a considerably smaller diameter roller 72, that is journaled in bearings 73. The bearings 73 are adjustably carried, as at 74, on the arms 75 of a yoke 76 which pivots on arms 77 that are carried by the legs 5 and 6 of the main frame. The yoke 76 is adjusted to raise and lower the roller 72 for positioning the belt 40 relatively to a can when the can is in position to receive the meat balls. The yoke 76 is adjusted by a screw 78 which is rotatably supported in a post 79 carried on the front rail 8 of the main frame. The threaded end of the screw is rotatable within a nut 80 that is trunnioned between ears 81 depending from the cross bars 82 of the yoke.

The empty cans 83 are delivered by gravity through an inclined chute 84 that extends across the delivery end of the belt 40, where the cans are stopped and released by a detent 85. The chute then turns the cans to an upright position on an offtake conveyor 86 which carries the cans, with the meat balls therein, to a station where other ingredients are added, such as the spaghetti and spaghetti sauce, before the lids are applied.

The detent 85 is pivoted between ears 87 that are fixed to a part of the chute frame, so that one end 88 thereof engages the side of each can as it reaches the discharge end of the belt 40. The detent 85 has an arm 89 extending therefrom, as best shown in FIG. 1. The arm 89 is actuated in one direction to release the foremost can by an electromagnet contained in the housing 90 and is actuated in the opposite direction by a coil spring 91. The electromagnet is connected to the arm by a link 92 and the coil spring 91 has one end connected to the arm 89 and the other end to a part of the housing 90.

Since the forming mechanism discharges three meat balls at a time onto the belt, the meat balls are carried in spaced relation on the upper run of the belt for discharge into the open end of the can. Because of the radial spacing of the bores 17 about the rotor 16, there is a slight lag in dropping the next three meat balls, so that the meat balls are discharged into a can in multiples of three until the desired number of meat balls is deposited in each can. It will be obvious that by timing the detent with discharge of meat balls from the forming mechanism and maintaining a constant linear speed of the belt, various numbers of meat balls can be deposited in each can. For example, if the interval between operations of the detent 85 is such that the belt can deliver six meat balls, each can will contain six meat balls, or if the time interval is increased, the belt will deliver nine meat balls. Therefore, the electromagnet is controlled by one or the other of two switches 93 and 94, preferably located on the side of the leg 5 of the main frame, as shown in FIG. 2. The switches have rollers 95 and 96, respectively, adapted to operate on cams 97 and 98 rotated at different speeds. In order to select the cam that will operate the related switch, the cams 97 and 98 are slidably secured on driving shafts 99 and 100 by keys 101 and each cam is separately moved on its shaft by an adjusting screw 102. The adjusting screws are carried by brackets 103 extending from the leg 5 and which have threaded openings 104 in which the threaded shanks 105 of the screws are mounted. The end of each screw carries a shipper 106 that moves along the bracket and engages in an annular groove 107 of the respective cams. The screws have handles 108 by which the screws may be turned in making the required adjustments. The cams are locked in their in or out positions by jam nuts 109 that are threaded on the shanks of the screws and which engage the brackets 103 (see FIG. 4). The shafts 99 and 100 are journaled in bearings 110—111 and 112—113 that are carried by the legs 4 and 6, as shown in FIG. 2. The shaft 111 is driven from the shaft 112 through differentially sized gears 114 and 115 whereby the shaft 112 rotates at a higher speed when the shaft 111 is driven, as now to be described.

A main drive of the machine is from a motor 116 mounted on a platform 117 carried from the main frame adjacent the leg 3. The motor actuates a speed reduction unit 118 that is supported on a lower rail 8 (FIGS. 2 and 6). The input shaft 119 of the speed reduction unit 118 carries a pulley 120 that is driven from a pulley 121 on the motor shaft through an endless belt 122 operating over the respective pulleys. The power delivery shaft 123 of the speed reduction unit carries a sprocket 124 to drive a sprocket 125 on a countershaft 126 through a chain 127. The countershaft 126 is best illustrated in FIG. 6 and is carried in bearings 128 and 129 fixed to the legs 3 and 5 of the main frame. Fixed to the countershaft in line with the sprocket 34 previously described is a sprocket 130, and operating over the sprockets is a chain 131 to drive the forming mechanism 11. Also fixed on the countershaft is a sprocket 132 that drives a sprocket 133 on the lower of the driving shafts 100 through a chain 134 operating over the respective sprockets (FIG. 6).

In order to drive the belt conveyor 40, the shaft 70 carrying the roller 69 has a sprocket 135 aligning with a driving sprocket 136 on the power input shaft 119. Mounted on a part of the main frame on the opposite side of the sprocket 136 is an idle sprocket 137. Operating on the sprockets 135 and 137 and having a lower run 138 operating over the sprocket 136 is a driving chain 139 for operating the conveyor belt at a definite speed relative to the rotation of the molder and the driving shafts 99 and 100. In order to provide a fine adjustment of the cams, the high lobes 140 thereof are preferably arranged on a spiral, as shown in FIG. 3.

Figure 12:
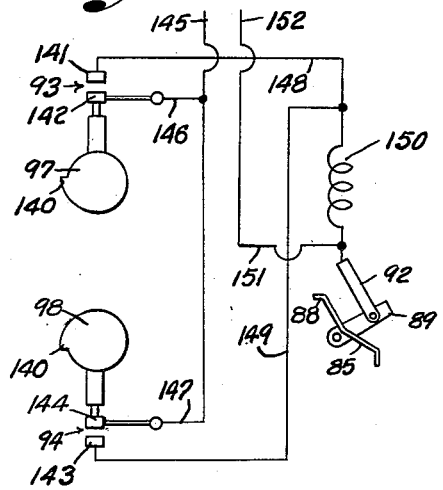
FIG. 12 is an electrical diagram of the cam operated switches for operating the solenoid controlling the can detent for effecting dwell of the can relatively to the operation of the conveyor belt.

The wiring diagram for the switches 93 and 94 is shown in FIG. 12, in which it will be noted that the contacts 141—142 and 143—144 are normally open. Current is supplied to the contacts 142 and 144 through a line conductor 145 and branch conductors 146 and 147. The other contacts 141 and 143 are connected through conductors 148 and 149 to the solenoid winding 150 of the electromagnet. The circuit is completed through the winding 148 by a conductor 151 leading to the other line conductor 152. When the switch 93 is being operated by the cam 97, the other cam 98 is moved out of contact with the follower 96 of the other switch, and vice versa.

The operation of the machine is as follows:

Cans 83 are delivered through the chute 84, to be stopped by the end 88 of the detent 85, since the spring 91 is normally holding the detent in the path of the cans. Assuming that six meat balls are to be packed into each can, the lower cam 98 is moved out of operating relation with the switch 94 and the faster operating cam 97 is moved into position for actuating the switch 93. These adjustments are readily effected by operating the adjusting screws 102 to move the respective cams on their shafts 99 and 100. The delivery end of the conveyor belt 40 is moved up or down so that the roller 72 extends across the open end of the can that has been stopped by the detent. This adjustment is accomplished by means of the screw 78, which swings the arms 75 to carry the roller 72 into desired position. The conduit 19 is connected with a source of the meat preparation. The final adjustments of the conveyor belt 40 and cam 98 are best made with the machine in operation.

With the motor 61 in operation, the first of the stripping rollers 38 is being constantly driven in the direction of the arrow indicated at b. Rotation of the stripping roller 38 produces a corresponding rotation of the stripping roller 39 through the gear 64, idler gear 65 and gear 67. With the main motor 116 in operation, the conveyor belt is driven with the upper run of the belt moving in the direction of the open end of the can. This drive is effected through the belt 122, pulley 120, sprocket 119, chain 139 and sprocket 135. The cam 97 is also constantly rotated through gears 114—115, shaft 100, sprocket 133, chain 134, sprocket 132, countershaft 126, sprocket 125, chain 127, and sprocket 124, on the shaft 123 of the speed reduction gearing unit 118. The meat ball forming rotor is rotated in the direction indicated by the arrow a, FIGS. 9, 10 and 11, through the sprocket 34, chain 131, and sprocket 130 on the countershaft 126. The molder, conveyor belt and cam 97 are, therefore, rotating in timed relation with each other.

With the meat preparation being forced into the manifold 20 under pressure, the meat preparation discharges through the port 25 and pushes the first row of pistons inwardly, to be stopped by the roller 26 to fill the spaces in the bores opened by displacement of the pistons, the roller 26 being adjusted by shifting the arm 28, as disclosed in the above mentioned application, to provide the desired thickness of the meat balls. With continued movement of the rotor 24, the face 23 of the manifold cuts off the meat preparation in the bores from the meat preparation in the manifold, and as soon as the pistons engage the cam 31 they begin to be forced outwardly thereby, progressively ejecting the meat balls from the rotor by the time the rotor has turned 180°. The meat balls, however, being of sticky, viscous character, stick to the end faces of the pistons during ejection. However, when the meat balls come into contact with the rotating stripping roller 38, which is turning in a counterclockwise direction (FIG. 5), they are pulled loose from the faces of the pistons, as shown in FIG. 9. It is possible that the sticky characteristic of the meat balls will cause them to cling to the stripping roller 38 as they are being stripped thereby, with the result that they are brought into contact with the lower stripping roller 39, as shown in FIG. 10, which is also rotating in a counterclockwise direction. By this time, the meat balls are overhanging the upper run of the conveyor belt, so that gravity aided by movement of the stripping roller 39 causes the meat balls to fall upon the conveyor belt 40, as shown in FIG. 5. Closely following are the meat balls formed in the succeeding bores of the rotor, so that the meat balls are dropped onto the conveyor in timed sequences in groups of three. Since the conveyor belt is in continuous operation, the meat balls are carried into the open end of the can, as also shown in FIG. 5.

The speed of the belt and detention time of the can are such that two sequences, or six meat balls, are deposited in the can before the cam 97 closes circuit through the switch 93 to energize the winding 150 of the electromagnet and cause the link 92 to release the detent. The space between the following sequences of meat balls gives time for the cans to move into and out of alignment with the discharge end of the conveyor. After breaking of the circuit by reopening of the switch 97, the spring 91 is effective to return the detent to stopping position with the following can. The released can passes on through the turning portion of the chute and is deposited in upright position on the offtake conveyor 86. If required, slight adjustments may be made both in the elevation of the roller 72 and in the timing of the detent, to assure that six meat balls are deposited in each can.

If, for example, nine meat balls are to be deposited in each can, the can must be held by the detent for a long enough period of time for the conveyor belt to deliver nine meat balls. This is accomplished by using the slower operating cam 98 which is driven by the shaft 100 having the slower speed, therefore, the intervals between actuations of the solenoid 150 are such for the detent to hold the can for the required period of time.

While we have particularly described an apparatus for removing meat balls from a forming and ejecting mechanism and placing the meat balls in cans, it is obvious that the invention is adaptable to other meat products that are ordinarily placed in the can by hand.

We claim and desire to secure by Letters Patent:

1. An apparatus for feeding meat balls ejected from a forming mechanism in timed sequences, including a conveyor for receiving the meat balls thereon from the forming and ejecting mechanism and having a delivery end, means for stripping the meat balls from the ejecting mechanism onto the conveyor, means for directing cans in consecutive order to the delivery end of the conveyor, means for detaining each can at the delivery end of the conveyor, means for releasing the detaining means for advance of the cans, and means connected in driving relation with the conveyor to actuate the release means in time with movement of a given number of meat balls into each can by said conveyor.

2. An apparatus for feeding meat balls ejected from a forming mechanism in timed sequences, including a conveyor for receiving the meat balls thereon and having a delivery end, roller means for stripping the meat balls from the forming and ejecting mechanism onto the conveyor, means for directing cans in consecutive order to the delivery end of the conveyor, means for detaining each can at the delivery end of the conveyor, means for releasing the detaining means for advance of the cans, and means connected in driving relation with the conveyor for actuating the release means in time with movement of a given number of meat balls into each can by said conveyor.

3. An apparatus for feeding meat balls ejected from a forming mechanism in timed sequences, including a conveyor for receiving the meat balls thereon and having a delivery end, means for directing cans in consecutive order to the delivery end of the conveyor, means for detaining each can at the delivery end of the conveyor, means for releasing the detaining means for advance of the cans, means connected in driving relation with the conveyor to actuate the release means in time with movement of the meat balls into each can by said conveyor, and means for adjusting the last named means for controlling the number of meat balls deposited in each can.

4. An apparatus for feeding meat balls ejected from a forming mechanism in timed sequences, including a conveyor for receiving the meat balls thereon and having a delivery end, stripping means cooperating with the forming and ejecting means for dropping the meat balls onto the conveyor, means for directing cans in consecutive order to the delivery end of the conveyor, means for detaining each can at the delivery end of the conveyor, means for releasing the detaining means for advance of the cans, means connected in driving relation with the conveyor to actuate the release means in time with movement of the meat balls into each can by said conveyor, and means for adjusting the last named means for controlling the number of meat balls deposited in each can.

5. An apparatus for feeding meat balls ejected from a forming mechanism in timed sequences, including a conveyor having support on the frame below the forming and ejecting mechanism for receiving the meat balls thereon and having a delivery end projecting from a side of the frame, means for directing cans in consecutive order to the delivery end of the conveyor, a detent for detaining a can at the delivery end of the conveyor for receiving the meat balls therein, a shaft having support by the frame, a cam slidably keyed to the shaft, an electric switch fixed to the frame and having contact with the cam for operating the switch, an electromagnet in connection with the detent, an electrical circuit connecting the switch with the electromagnet, and means for moving said cam relatively to said switch for timing release of the detent with the movement of the meat balls by the conveyor.

6. An apparatus for feeding meat balls ejected from a forming mechanism in timed sequences, including a conveyor having support on the frame below the forming and ejecting means for receiving the meat balls thereon and having a delivery end projecting from a side of the frame, means for directing cans in consecutive order to the delivery end of the conveyor, a detent for detaining a can at the delivery end of the conveyor for receiving the meat balls therein, a pair of shafts having support by the frame, means connecting one of the shafts in driven relation with the actuating means for said forming and ejecting means, gears connecting the shafts to drive the other shaft at a higher speed, cams slidably keyed to the shafts, electric switches fixed to the frame and having contact with the cams for operating the switches, an electromagnet in connection with the detent, an electrical circuit connecting the switches with the electromagnet, and means for moving one of said cams into operative contact with its related switch and the other out of contact with its related switch to operate the detent by one or the other of said shafts for changing the number of meat balls deposited in the respective cans by the conveyor during the period that a can is detained at the delivery end of the conveyor.

7. An apparatus for feeding meat balls ejected from a forming mechanism in timed sequences, including a conveyor having pivotal support on the frame below the forming and ejecting means for receiving the meat balls thereon and having a delivery end projecting from a side of the frame, means for directing cans in consecutive order to the delivery end of the conveyor, a detent for detaining a can at the delivery end of the conveyor for receiving the meat balls therein, means for adjustably supporting the delivery end of the conveyor relatively to the open end of the can that is detained by the detent, and means actuated in time with the forming and ejecting means for releasing the detent to advance the cans.

8. An apparatus for removing meat balls from a rotary meat ball forming and ejecting mechanism arranged to rotate on a substantially horizontal axis, said apparatus comprising a stripping assembly including a roller having support in the path of the meat balls as they are ejected by said mechanism, and means for rotating the roller with circumferential face portions thereof nearest the forming and ejecting mechanism moving in the opposite direction to movement of facing portions of said forming and ejecting means.

9. An apparatus for removing meat balls from a rotary meat ball forming and ejecting mechanism arranged to rotate on a substantially horizontal axis, said apparatus comprising a stripping assembly including a frame, means supporting the frame below said forming and ejecting mechanism, a stripping roller journaled on the frame in position to engage the meat balls when ejected from said forming and ejecting mechanism, means for adjusting the frame relatively to said forming and ejecting mechanism for positioning the stripping roller for engaging the meat balls ejected by said mechanism, and means carried by the frame and having a driving connection with the stripping roller to rotate the stripping roller in a direction with circumferential face portions thereof which are engaged by the meat balls moving away from the forming and ejecting mechanism.

10. An apparatus for removing meat balls from a rotary meat ball forming and ejecting mechanism arranged to rotate on a substantially horizonal axis, said apparatus comprising a stripping assembly including a frame, means supporting the frame below said forming and ejecting mechanism, an upper stripping roller journaled on the frame in position to engage the meat balls when ejected from said forming and ejecting mechanism, means carried by the frame and having a driving connection with the stripping roller to rotate the stripping roller in a direction with circumferential face portions thereof that are engaged by the meat balls moving away from the forming and ejecting mechanism, a lower stripping roller, and means on the frame for rotatably carrying the lower stripping roller for releasing the meat balls from contact with the first stripping roller.

11. An apparatus for removing meat balls from a rotary meat ball forming and ejecting mechanism arranged to rotate on a substantially horizontal axis, said apparatus comprising a stripping assembly including a frame, means supporting the frame below said forming and ejecting mechanism, an upper stripping roller journaled on the frame in position to engage the meat balls when ejected from said forming and ejecting mechanism, means carried by the frame and having a driving connection with the stripping roller to rotate the stripping roller with circumferential face portions thereof nearest the forming and ejecting mechanism moving in opposite direction with respect to movement of facing portions of the forming and ejecting mechanism, levers having pivotal support on the frame about the axis of the stripping roller, a lower stripping roller carried by said levers parallel with the upper stripping roller for releasing the meat balls from contact with the upper stripping roller, adjusting means connecting the levers with parts of said frame for positioning the levers for adjusting the lower stripping roller about the axis of the upper stripping roller, and means for driving the lower stripping roller in the same direction as the upper stripping roller.

12. An apparatus for removing meat balls from a rotary meat ball forming and ejecting mechanism arranged to rotate on a substantially horizontal axis, said apparatus comprising a stripping assembly including a frame, means supporting the frame below said forming and ejecting mechanism, an upper stripping roller journaled on the frame in position to engage the meat balls when ejected from said forming and ejecting mechanism, means carried by the frame and having a driving connection with the stripping roller to rotate the stripping roller with circumferential face portions thereof nearest the forming and ejecting mechanism moving in opposite direction with respect to movement of facing portions of the forming and ejecting mechanism, a lower stripping roller, means carrying the lower stripping roller on the frame parallel with the upper stripping roller for releasing the meat balls from contact with the upper stripping roller, a gear on the first stripping roller, an idle gear in meshing contact with the gear on the upper stripping roller, and a gear on the lower stripping roller and meshing with the idle gear to drive the lower stripping roller in the same direction as the upper stripping roller.

13. An apparatus for removing meat balls from a rotary meat ball forming and ejecting mechanism arranged to rotate on a substantially horizontal axis, said apparatus comprising a stripping assembly including a frame, means supporting the frame below said forming and ejecting mechanism, an upper stripping roller journaled on the frame, means for adjusting the frame relatively to said forming and ejecting mechanism for positioning the upper stripping roller for engaging the meat balls when ejected, means carried by the frame and having a driving connection with the upper stripping roller to rotate the stripping roller with circumferential face portions thereof nearest the forming and ejecting mechanism moving in opposite direction with respect to movement of facing portions of the forming and ejecting mechanism, levers having pivotal support about the axis of the upper stripping roller, a lower stripping roller journaled in said levers parallel with the upper stripping roller for releasing the meat balls from contact with the upper stripping roller, adjusting means connecting the levers with parts of said frame to adjust the lower stripping roller about the axis of the first stripping roller, a gear on the first stripping roller, an idle gear on one of the levers and in meshing contact with the gear on the first stripping roller, and a gear on the lower stripping roller and meshing with the idle gear to drive the lower stripping roller.

14. In an apparatus of the character described, a stripping assembly for stripping meat balls from a meat ball ejecting means including a frame, an upper stripping roller journaled on the frame in position to engage the meat balls, means carried by the frame and having a driving connection with the stripping roller to rotate the upper stripping roller, bell crank levers having pivotal support about the axis of the stripping roller, a lower stripping roller carried by said bell crank levers parallel with the first stripping roller for releasing the meat balls from contact with the first stripping roller, and means for driving the lower stripping roller.

15. In an apparatus of the character described, a stripping assembly for stripping meat balls from a meat ball ejecting means including a frame, an upper stripping roller journaled on the frame in position to engage the meat balls, means carried by the frame and having a driving connection with the stripping roller to rotate the upper stripping roller, levers having pivotal support about the axis of the stripping roller, a lower stripping roller carried by said levers parallel with the first stripping roller for releasing the meat balls from contact with the upper stripping roller, adjusting means connecting the levers with parts of said frame to adjust the lower stripping roller about the axis of the upper stripping roller, a gear on the upper stripping roller at one of the levers, an idle gear on said one lever and in meshing contact with the gear on the upper stripping roller, and a gear on the lower stripping roller and meshing with the idle gear to drive the lower stripping roller.

16. An apparatus for removing meat balls from a forming and ejecting mechanism arranged to rotate on a substantially horizontal axis, said apparatus including a conveyor, a stripping roller having support in the path of the meat balls as they are ejected by said mechanism, a second roller cooperating with the first roller for feeding the meat balls onto the conveyor, means for rotating said rollers with circumferential face portions thereof nearest the forming and ejecting mechanism moving in opposite direction to movement of directly facing portions of said forming and ejecting mechanism to strip the meat balls therefrom, means for directing cans in consecutive order to the conveyor, means for detaining each can at the conveyor, means for releasing the detaining means for advance of the cans, and means connected in driving relation with the conveyor for actuating the release means in time with movement of a given number of meat balls into each can by said conveyor.

References Cited in the file of this patent

UNITED STATES PATENTS

| | | |
|---|---|---|
| 2,211,638 | Benz | Aug. 13, 1940 |
| 2,509,971 | Elaesser | May 30, 1950 |
| 2,545,451 | Elaesser | Mar. 20, 1951 |
| 2,899,787 | Erekson | Aug. 18, 1959 |

UNITED STATES PATENT OFFICE
CERTIFICATE OF CORRECTION

Patent No. 3,122,869                  March 3, 1964

Jack M. Miller et al.

It is hereby certified that error appears in the above numbered patent requiring correction and that the said Letters Patent should read as corrected below.

In the grant, lines 3 to 5, for "assignors to Marlen Equipment Company, of Overland Park, Michigan, a corporation of Missouri," read -- assignors to Marlen Equipment Company, of Overland Park, Kansas, a corporation of Missouri, --; in the heading to the printed specification, lines 7 and 8, for "assignors to Marlen Equipment Company, Overland Park, Mich., a corporation of Missouri" read -- assignors to Marlen Equipment Company, Overland Park, Kans., a corporation of Missouri --.

Signed and sealed this 7th day of July 1964.

(SEAL)
Attest:

ERNEST W. SWIDER                  EDWARD J. BRENNER
Attesting Officer                   Commissioner of Patents